United States Patent [19]
Vest

[11] 3,822,402
[45] July 2, 1974

[54] ADJUSTABLE LINEARITY ELECTRONIC TACHOMETER WITH PEAK READOUT
[76] Inventor: Gary W. Vest, 4480 Broadview Rd., Cleveland, Ohio 44109
[22] Filed: July 31, 1972
[21] Appl. No.: 276,523

[52] U.S. Cl. ............... 324/169, 324/78 E, 324/103, 307/271, 307/304
[51] Int. Cl. ............................................. G01p 3/48
[58] Field of Search .......... 324/166, 168, 169, 170, 324/173, 174, 175, 162, 78 J, 78 E, 161, 102, 103, 111; 328/140; 307/271, 230, 233, 304

[56] References Cited
UNITED STATES PATENTS

| | | | |
|---|---|---|---|
| 3,186,218 | 6/1965 | Hollis | 324/169 |
| 3,473,119 | 10/1969 | Mazurkevics | 324/169 |
| 3,581,206 | 5/1971 | Strohm | 324/169 |
| 3,600,679 | 8/1971 | Hill | 324/162 |
| 3,602,817 | 8/1971 | Nilson | 324/169 |

Primary Examiner—Michael J. Lynch

[57] ABSTRACT

An improved tachometer for measuring and indicating the speed rate of an internal combustion engine having an electrical ignition system. Electrical pulses from the ignition system are used to energize a transistor that switches on and off in response to each ignition pulse. The resulting square wave pulses in the transistor circuit are filtered to provide a D.C. voltage that varies non-linearly with engine speed. The D.C. voltage is impressed across a field-effect transistor with a response characteristic that varies non-linearly in a manner that balances the non-linearity of the D.C. voltage variation to produce a voltage across a meter, that varies essentially linearly or in an otherwise controlled manner with engine speed. A "memory" capacitor may be connected in parallel with the field-effect transistor input to be charged to a level representative of the maximum voltage impressed across the field-effect transistor input in response to the ignition system impulses and then at a later time be switched into the field-effect transistor input circuit to provide a meter readout of the stored maximum signal.

12 Claims, 3 Drawing Figures

ADJUSTABLE LINEARITY ELECTRONIC TACHOMETER WITH PEAK READOUT

BACKGROUND OF THE INVENTION

This invention relates to electronic tachometers for measuring and indicating the speed of internal combustion engines and especially to electronic tachometers that utilize electrical pulses generated at a rate proportional to engine speed, such as the pulses from an electrical ignition system. More particularly, the invention relates to an improved electronic control circuit for a tachometer, that assures a controlled linearity response characteristic for the indicating meter.

Electronic tachometers of the type to which this invention relates, sense ignition pulses such as from the firing of one of the engine spark plugs and use the pulses to operate a transistor that serves to switch off and on into a differentiating circuit. The resulting pulses are rectified and impressed into a current sensing milliammeter generally having a parallel filter capacitor. Accordingly, the meter reading is directly proportional to the amount of current that flows through the meter in the process of charging the capacitor.

In order to obtain a linear response utilizing prior art tachometer circuitry it is essential, first of all, that the variation in current level through the meter coil be a linear function of engine speed (RPM). For this condition to exist it is essential that the energy content of each discrete pulse through the milliammeter be identical. While this theoretical condition is never completely achieved, it can be best approximated by providing that the pulses be of relatively narrow width as compared with the pulse interval. This condition becomes most critical, of course, at higher engine speed rates.

Secondly, the D.C. voltage developed across the capacitor in parallel with the milliammeter must be considerably less than the direct-current voltage supply source to the transistor circuit. If any substantial buildup of voltage were to develop across the capacitor, the amplitude of the current pulses through the meter would be proportionally reduced and result in serious non-linearity in the relation between the current level through the meter and the engine speed rate. To avoid this problem it is common practice to limit the voltage level developed across the capacitor to no more than 10 percent of the D.C. supply voltage to the transistor circuit.

Because of the need to limit the voltage developed across the capacitor, the voltage across the milliammeter is also relatively low. Therefore, the sensitivity of the milliammeter must be relatively high and its coil resistance relatively low. These conditions create a need for a more expensive mechanical meter movement than is usually justified under the circumstances. In any event, tachometers in the prior art utilizing this type of circuitry typically have a non-linearity in the response of the meter indicator of 5% or more due to this effect.

Turning to another aspect of prior art tachometers as used in automotive vehicles, it has been very difficult, if not impossible, in the past for a driver to obtain an accurate engine speed rate reading while operating a vehicle, due to the necessity of his directing his attention to the space ahead of the vehicle. Accordingly, it is often difficult to obtain accurate readings of the tachometer during operation, particuarly, for example, the maximum engine speed rate that occurs during the period when the vehicle is operating at high speed. Often such a reading is important to the driver and engine mechanic in order to determine the condition of the vehicle engine and whether or not the engine is in optimum running condition. These requirements are, of course, particularly important in the field of auto racing.

The versatility and accuracy of tachometers is limited in applications where the engine would be operated only over a segment of its total speed range, such as the range in which maximum power is developed. In such instances, it would be advantageous if the response range of the tachometer milliammeter were expanded to more closely match the operating range of the engine rather than to provide an equal response over its entire scale.

The present invention resolves the difficulties indicated above and affords other features and advantages heretofor not obtainable.

SUMMARY OF THE INVENTION

It is among the objects of the invention to improve the accuracy, particularly as to linearity of response, in electronic tachometers.

Another object is to provide high quality meter indications in electronic tachometers without the need for complicated, sensitive and expensive meter mechanical operating mechanisms.

Still another object is to provide a means for measuring and storing for later read-out, the maximum engine RPM that occurs during a period of high speed automotive vehicle operation.

A further object is to provide an electronic tachometer wherein the circuit elements may be adjusted to achieve optimum expansion of response of a meter as a function of engine RPM.

A still further object is to provide an improved speed of response in the measurments and indications provided by electronic tachometers for automotive vehicles.

These and other objects are accomplished by means of an improved electronic tachometer of the type described utilizing a transistor responsive to an electrical pulse signal from the engine ignition system corresponding to the speed rate to be measured and adapted to energize a circuit in series with a D.C. voltage source such that each ignition system pulse causes the circuit to be interrupted thus cutting off the D.C. voltage and producing a square wave voltage signal. The square wave voltage signal is impressed into a differentiating circuit and a capacitor in the circuit arranged to be charged and discharged by an amount proportional to the number of operating pulses. The circuit components are selected such that the voltage used to operate an indicating meter is fairly high so that a voltage sensing meter rather than a current sensing meter may be used. Means are provided for filtering the voltage to provide a voltage level that varies relative to engine speed, although it may be in a non-linear fashion.

According to the invention, a field-effect transistor is connected with its input across the capacitor, the transistor having a response characteristic that is adjustable to vary non-linearly with the voltage devloped across the condenser. The deviation is such that it offsets the deviation in response resulting from the filtered voltage level so that the resultant response or voltage variation with engine speed is essentially linear.

According to one aspect of the invention, the meter circuit is adjustable to alter the meter response characteristics, so as to provide a full expansion of readings within a specified narrow segment of the total operating speed range of the engine being monitored. Under this condition of operation, the meter would not respond significantly to input levels above or below the selected range other than to indicate the relative magnitude of the input signal with respect to the operating range.

According to another aspect of the invention, a capacitor is placed in the circuit in a manner whereby it is charged to a level representative of the highest engine speed experienced during a certain interval of meter operation. Then at some later point in time, such as when the engine is shut down the capacitor may be switched into the meter circuit to provide a static meter reading representative of the maximum engine speed that occurred during the preceding operating interval.

DESCRIPTION OF THE PREFERRED EMBODIMENT

Figure 1:
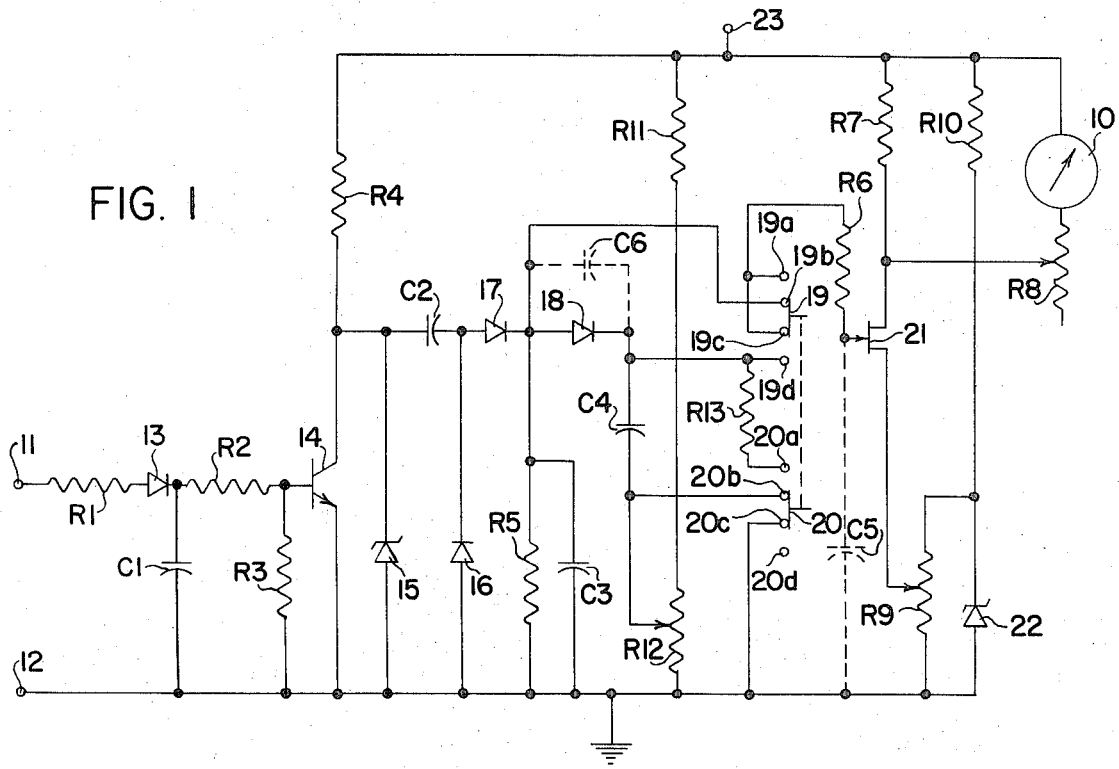
FIG. 1 is a schematic diagram of an electronic tachometer circuit embodying the invention.

Referring more particularly to the drawings, FIG. 1 illustrates the electronic circuitry for an automobile engine electronic tachometer, that illustrates one particular embodiment of the invention. The tachometer circuit includes a 300-ohm milliammeter 10 of conventional design and construction and has terminals 11 and 12 to which are connected leads from a pulse source such as the electrical pulses from one distributor contact. Beginning at the left-hand side of the diagram there are shown resistors R1, R2 and R3, capacitor C1 and a rectifier diode 13, all located in an input network that suitably attenuates and filters the electrical pulses applied at the input terminals 11 and 12.

The attenuated and filtered pulses are used to operate an NPN bipolar transistor 14 which will conduct when energized by a positive input pulse thus shorting out through resistor R4, a D.C. voltage applied at terminal 23 (e.g., from a 12 volt automobile electrical system) across a voltage-regulating diode 15. The transistor 14 will not conduct in the absence of a positive input pulse in which case the full voltage will appear across the diode 15. Thus, the level of the voltage across the diode 15 when the transistor 14 is not conducting (i.e., "is off") is dependent upon the regulation characteristics of the diode 15 and the current supplied to the diode 15 through the resistor R4.

Since the rate of the input pulses is proportional to the engine RPM, the transistor 14 will switch "on" and "off" in a proportionate repetitive manner thus producing a rectangular voltage wave form across the diode 15. When the transistor 14 is "on" or energized and the voltage across the diode 15 is approximately zero, any positive voltage charge on the capacitor C2 will discharge through the transistor 14 and the diode 16. When the transistor 14 is deenergized or "off" and a voltage is impressed across the diode 15, the capacitor C2 will recharge from the voltage supply source 23. The time constant of this charging circuit is dependent on the impedence values of the electrical components comprising the charging path and need be suitably chosen such that sufficient current is obtained to charge the capacitor C2 to a value approaching the regulating voltage of the diode 15 less the amount of voltage charge on the capacitor C3 and the loss across diode 17 within the time period that the transistor 14 remains "off" or deenergized at the highest RPM level encountered. The circuit elements described thus far are conventional and are typical of electronic tachometers of the prior art. It will be seen that the magnitude of the current that flows through the meter 10 is directly proportional to the number of input pulses received at the terminals 10 and 11. Accordingly, the deflection of the meter 10 will represent the engine RPM.

In order to obtain a linear meter response using prior art circuity, it is essential that the variation in current level through the coil of the meter 10 be a linear function of engine RPM. Thus, it is essential first of all that the energy content of each discrete charging current pulse through the capacitor C2, be identical. While this ideal condition cannot be realized, optimum conditions are achieved by providing that the pulse width of the charging current pulse through the capacitor C2 is small with respect to the total amount of time between pulses. This condition is most important at higher engine speeds.

Secondly, the maximum amount of voltage built up on the filtering capacitor C3 must be limited to a value substantially below the D.C. regulation voltage of the diode 15. If any substantial amount of voltage were to develop across the capacitor C3, the amplitude of the charging current pulses through the capacitor C2 would be proportionately reduced and result in a serious nonlinearity in the effective D.C. current level through the meter 10 as a function of engine RPM. Accordingly, the maximum voltage level developed across the capacitor C3 is normally limited to a value no more than 10 percent of the D.C. regulation voltage of the diode 15. When the level of the voltage developed across the capacitor C3 is limited to very low values, it becomes essential that the deflection sensitivity of the meter 10 be quite high and at the same time the coil resistance of the meter must be as low as possible. This combination of requirements necessitates a more expensive meter movement than is usually justified under the circumstances. For this reason, prior art tachometers utilizing this type of circuitry typically have a deflection nonlinearity of 5 percent or more.

According to the present invention, the relative values of the capacitors C2 and C3, the resistors R4 and R5 and the characteristics of the diodes 15, 16 and 17 are selected so as to allow a much more substantial buildup across the capacitor C3 as a funcion of RPM as opposed to the corresponding components in prior art tachometer circuitry. More specifically, these component values are selected such that the level of voltage developed across the capacitor C3 will approach the order of magnitude of the voltage across the voltage regulator diode 15 as engine RPM is increased toward its maximum value. The voltage across the capacitor C3, of course, will never be able to achieve the full level of the regulation diode voltage due to voltage drops across the capacitor C2 and the diode 17 as well as the discharge effect caused by the effective resistance of the resistor R5 in parallel with the capacitor C3. The voltage developed across the capacitor C3 in this circuit as a function of engine RPM will, however, be substantially greater than the voltage developed across the corresponding component in prior art tachometer circuits. In prior art circuits the maximum value of this voltage would normally reach only about 250 millivolts since higher values would be accompanied by serious circuit nonlinearity.

According to the present invention, however, higher voltages are advantageous and typically the maximum level of the voltage developed across the capacitor C3 might approach 5 volts which is on the order of 20 times higher than that developed across the corresponding circuit components in the prior art. In accordance with the above description, it will be apparent that the voltage across the capacitor C3 will be a nonlinear function of engine RPM. Accordingly, a direct readout of the voltage on the capacitor C3 calibrated in terms of engine RPM would not give an acceptable tachometer deflection or tachometer reading. Therefore, there must be provided a means for compensating for the nonlinearity that results.

According to the present invention, this compensation is achieved by means of a field-effect transistor 21. With the field-effect transistor 21, a nonlinear relationship is maintained between the applied gate-to-source voltage input and the output drain current. Furthermore, the nature of this nonlinearity (see curve A of FIG. 2) is such that the incremental increase in drain current for an incremental amount of input voltage increase, is greater at a higher input voltage level than it is at lower levels. However, just the opposite situation exists with respect to the nonlinearity in the voltage developed across the capacitor C3 as a function of engine RPM (see curve B of FIG. 2).

The nonlinearity in voltage level developed across the capacitor C3 as a function of engine RPM has a constantly diminishing character while the nonlinearity in the field-effect drain resistor current as a function of input gate-to-source voltage is of an increasing character within the range illustrated. Thus, if the voltage developed across the capacitor C3 is used as the input to the field-effect transistor which is operated in the manner shown, a net compensating effect takes place whereby the RPM input to the tachometer would produce a field-effect transistor output voltage (see curve C of FIG. 3) that varies in a linear relationship to the RPM input even though the input voltage to the field-effect transistor varies with engine RPM in a nonlinear manner.

Also, the tachometer circuit has an engine-RPM-responsive voltage input (the voltage across the capacitor C3 or the voltage across the resistor R7) that can be utilized to operate voltage actuated control devices such as speed regulators and the like.

A principal advantage of the present invention is that the power gain makes possible the use of an inexpensive low-sensitivity meter rather than an expensive high-sensitivity milliammeter. Furthermore, the additional power available to the meter 10 offers significantly improved speed of response.

Another significant feature of the present invention is that the selection of the field-effect transistor load line provides means for adjusting the linearity of response of the meter 10. A load line can be chosen so as to compensate for other circuit nonlinearity or it may be selected so as to introduce new nonlinearities and thereby provide the means to obtain special scale expansions. The typical values of the components in the circuitry of FIG. 1 are shown in Table I below.

TABLE I

| Circuit Element | Resistance (Ohms) | Circuit Element | Capacitance (Microfarads) | Rating (Volts) |
|---|---|---|---|---|
| R1 | 2.7K | C1 | 0.1 | 250V |
| R2 | 2.2K | C2 | 0.1 | 100V |
| R3 | 2.2K | C3 | 4.7 | 35V |
| R4 | 680 | C4 | 2.2 | 250V |
| R5 | 6.8K | C5 | 0.075 | 100V |
| R6 | 2.2Meg | C6 | 0.001 | 100V |
| R7 | 2.2K | | (Capacitors typically ±10% tolerance) | |
| R8 | 4.7K variable | | | |
| R9 | 2.2K variable | | | |
| R10 | 1K | | | |
| R11 | 4.7K | | | |
| R12 | 2.2K variable | | | |
| R13 | 1K | | | |

(Resistors typically ±5% tolerance ½ watt power rating)

The resistor R6 is a series input resistor to the gate of the field-effect transistor 21. The voltage regulator diode 22 has a resistor R10 in a series therewith to supply the current supply resistor in a conventional manner. The resistor R9 is a potentiometer that can be used to set the field-effect transistor source voltage so as to obtain a zero drain current bias condition when the voltage on the capacitor C3 is zero or, in applications where special scale expansions are desired to provide an offset condition, whereby the field-effect transistor drain current will remain near zero until some predetermined minimum voltage level is charged on capacitor C3. The total effect of resistance value of the resistor R7, the resistor R8, the meter 10 and the resistor R9, establish the maximum drain current point on the load line on the field-effect transistor 21. Also the resistor R8 serves as a full scale calibration potentiometer for the meter 10. As shown, the output as read on the meter 10 is effectively the voltage across the resistor R7.

Figure 2:
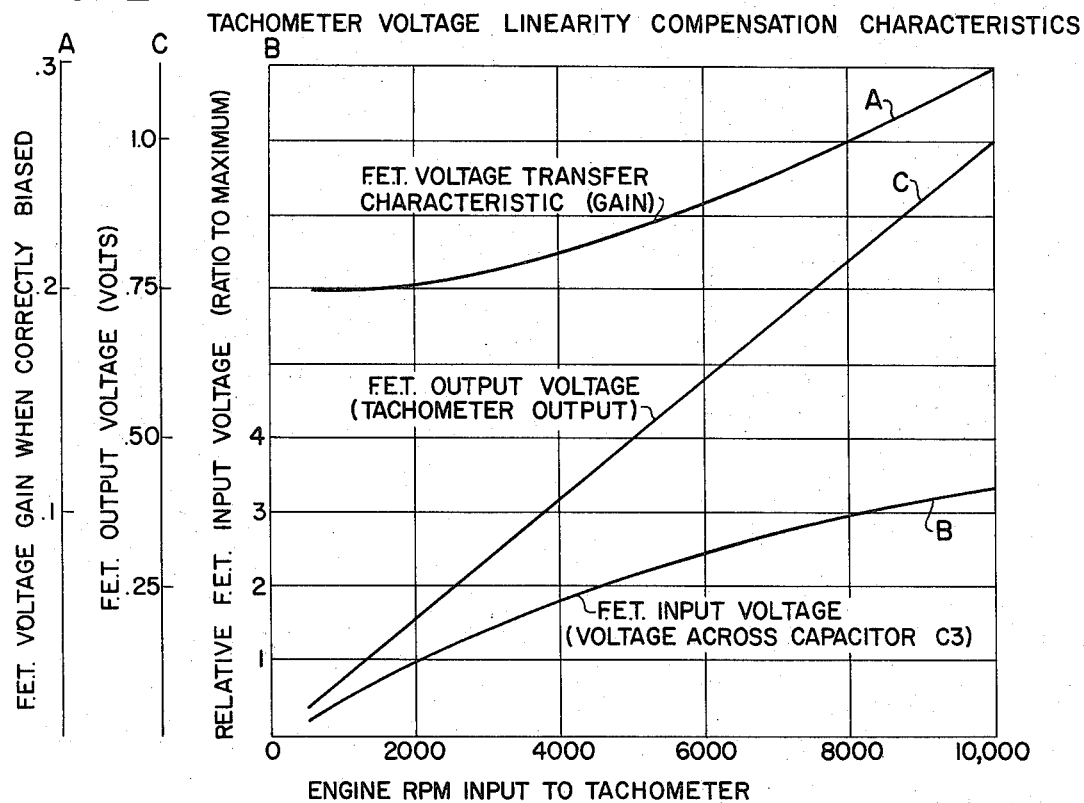
FIG. 2 is a graph illustrating voltage level variations characteristic of circuit elements of FIG. 1 and the resultant thereof.

FIG. 2 illustrates the tachometer voltage linearity compensation provided by the circuitry of the invention. The vector addition of the respective ordinates of the two curves A and B results in a straight line indicated at C which represents the relative field-effect transistor output voltage or, in other words, the tachometer output. It will be seen that this provides a linear meter response to engine RPM from lowest speeds to the very highest within the particular range of engine speeds.

As another aspect of the invention, there is provided a means incorporated in the circuit to provide an electronic memorization of the highest engine RPM encountered during a particular period of engine operation. The additional components utilized to provide this feature are an ultra low-leakage silicone diode 18, capacitors C4, C5 and C6 and resistors R11, R12 and R13 and a two pole, three position, spring return switch with movable contactors 19 and 20.

When the contactors 19 and 20 are in their normal positions as illustrated in FIG. 1, the tachometer circuit components R11, R12, R13 and C5 are nonfunctional. The diode 18 serves to charge the capacitor C4 to essentially the maximum voltage level present across the capacitor C3, although, the level of charge on the capacitor C4 may be slightly lower than the voltage across capacitor C3 by an amount equal to the voltage drop across the diode 18. When the capacitor C3 discharges, the diode 18 prevents the capacitor C4 from discharging.

If the position of the switch contactors 19 and 20 is changed such that the contactor 19 connects the terminals 19(c) and 19(d), and the contacts 20 connect the terminals 20 (c) and 20 (d), the field-effect transistor input will be the voltage stored on the capacitor C4. To compensate for the forward voltage drop of the diode 18, a slight additional voltage is introduced in series with the capacitor C4 by means of the voltage divider created by resistors R11 and R12. With the switch contactors 19 and 20 in this position, the input voltage to the field-effect transistor 21 is essentially equal to the voltage developed across the capacitor C3 at the highest RPM encountered.

The diode 18 preferably has a low forward voltage drop characteristic as well as an extremely high reverse resistance. The capacitor C4 must have an extremely low leakage to prevent self-discharge and also a low equivalent series impedance and low capacity so as to charge at the most rapid possible rate. Also a high impedance characterisiic for the field-effect transistor 21 is essential so as to avoid discharge of the capacitor C4 when the voltage level is being measured.

When the contactors 19 and 20 are moved to the third position wherein they connect the terminals 19a and 19b and the terminals 20a and 20b, respectively, the capacitor C4 will discharge to the resistor R13 and the field-effect transistor input will directly relay the voltage across the capacitor C3 which in this case is approximately zero due to the shorting of the capacitor C4. This switch position serves as a means of "erasing" or "clearing" information stored in the memory system.

The purpose of the capacitor C5 is to provide a high impedance connection of the field-effect transistor gate to ground, in order to prevent erratic meter readings when the switch units 19 and 20 are in a transient position between the contacts.

The purpose of capacitor C6 is to act as a bypass for high frequency A.C. voltages which are typically present. C6 thereby serves to eliminate errors in the "memory" reading which might otherwise be caused by detection of such voltages by diode 18.

The memory function described above represents a distinct advantage in the usefulness of the tachometer. As an additional advantage, irrespective of whether or not the memory function is utilized, the voltage across the capacitor C3 is of sufficient magnitude as to be used directly as a signal source for operating voltage actuated control devices such as an RPM limiter or an engine speed regulator. When used in these circumstances, the tachometer function is identical except that when a certain predetermined RPM level is reached, the voltage stored on the capacitor C3 will reach a predetermined level that can be adjusted to correspond to a threshold input level setting for the engine speed regulator. This threshold level setting would in effect be a sensing circuit capable of detecting the voltage on the capacitor C3 and automatically energizing the regulating function when the voltage on the capacitor C3 reaches the predetermined level. This might be accomplished, for example, by downgrading the automobile ignition circuit when the RPM reaches the predetermined level. Thus, for lower RPM levels, the ignition circuit would operate unrestricted but when the threshold RPM is reached, a downgrading action by the engine speed regulator would prevent the engine speed from exceeding this maximum value. Such a system combined with a tachometer reading would be advantageous in automotive racing applications as well as for commercial purposes, such as in truck engine speed regulators.

The memory function described herein would not be practical on prior art tachometer designs since, as previously illustrated, the level of output voltages normally encountered would by necessity of obtaining meter linearity, be too low to utilize the techniques described. Likewise, the output voltages on prior art tachometer designs would also be too low to directly operate voltage activated control devices.

Figure 3:
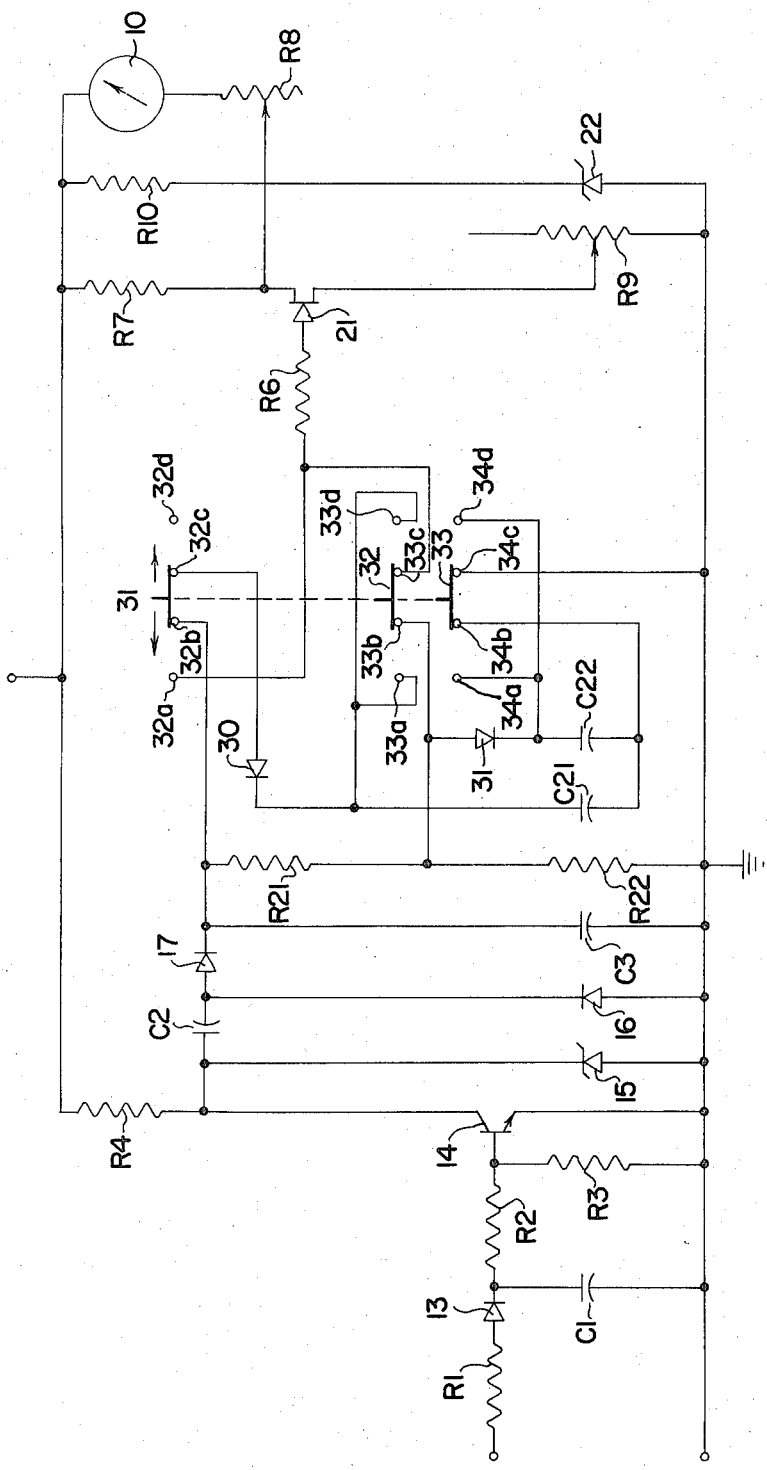
FIG. 3 is a schematic diagram of an alternate form of electronic tachometer circuit embodying the invention.

FIG. 3 shows an alternate form of circuit arrangement in accordance with the invention wherein modified circuitry is used for the specific purpose of eliminating the error that might be induced in meter readings due to the forward voltage drop across the "memory diode" 18 of the circuit of FIG. 1. According to this alternate embodiment, the forward voltage drop attributable to the diode 18 is compensated for by canceling out the resulting error in a different manner.

Referring to FIG. 3, it will be seen that when the switch contactors 32, 33 and 34 are in the normal position shown, the voltage across the capacitor C22 will equal the peak voltage across resistor R22 minus the voltage across the diode 31. The voltage across the capacitor C21 will equal the peak voltage across the resistor R21 plus the peak voltage across the resistor R22 less the voltage across the diode 30, and the voltage across the diode 30 will equal the voltage across the diode 31 providing the diodes are equivalent or have equivalent characteristics. Accordingly, the voltage levels across the capacitors C21 and C22 will each maintain their values for indefinite periods because there are no discharge paths for C21 and C22 when the switch sections 32, 33 and 34 are in the center position illustrated.

Thus, with the switch contactors in the center position as shown, the voltage across the field-effect transistor 21 is equal to the voltage across the resistor R22 and is directly proportional to the voltage across the capacitor C3 which in turn is proportional or representative of engine speed. When the switch contactors 32, 33 and 34 are moved to the right as viewed in FIG. 3, the voltage applied to the field-effect transistor gate is the result of a subtractive series combination of the capacitors C21 and C22. Accordingly, the voltage across the field-effect transistor 21 will equal the voltage across the capacitor C21 less the voltage drop across the capacitor C22. Or, $V = V_{C21} - V_{C22}$ $= (V_{R21\ peak} + V_{R22\ peak} - V_{D30}) - (V_{R22\ peak} - V_{D31})$ $= V_{R21\ peak} + V_{D31} - V_{D30}$ Since $V_{D31} = V_{D30}$ Then $V = V_{R21\ peak}$ Because the voltage drop across the diode 32 equals the voltage drop across the diode 30, the voltage across the field-effect transistor 21 will therefore be equal to the peak voltage across the resistor R21.

By properly selecting the values of R21 and R22 so that they are of equal resistance, the value of the voltage drop across these resistors will therefore be equal. Thus, when the switch is moved to the right, the input voltage signal to the field-effect transistor 21 is equal to the peak voltage across the resistor R21 which is also equal to the peak voltage across R22 and is proportional to the maximum voltage encountered across the capacitor C3.

When the switch sections 32, 33 and 34 are moved to the left as viewed in FIG. 3, all of the charge stored on the capacitors C21 and C22 is discharged.

The effect of this circuitry is to cancel out the portions of the respective voltage levels stored in the "memory" capacitors which are attributable to the forward voltage drop across the diodes in series with each respective capacitor. Thus, the error due to the forward voltage drop has been fully cancelled. While this modified form of circuit arrangement will not be necessary for all applications, it does achieve beneficial results in many circumstances.

While the invention has been shown and described with respect to specific embodiments thereof, this is intended for the purpose of illustration rather than limitation and other modifications and variations of the specific forms herein shown and described will be apparent to those skilled in the art, all within the intended spirit and scope of the invention. Accordingly, the patent is not to be limtied to the specific embodiments herein shown and described or in any other way that is inconsistent with the extent to which the progress in the art has been advanced by the invention

I claim:

1. In a device for converting a train of electrical pulses with a frequency representative of an engine speed, into a voltage signal that varies predictably with the engine speed, including a direct current voltage source, and a circuit connected to said voltage source responsive to said engine speed pulses for providing uniform operating pulses at the frequency of said engine speed pulses, the improvement which comprises:

circuit means connected to said circuit for converting said operating pulses into a voltage signal with a level that varies non-linearly with engine speed,
a field-effect transistor connected to receive its input from said circuit means for producing a resulting signal, and
means for biasing said field-effect transistor into having a response characteristic that varies non-linearly with voltage level in a manner such that said resulting signal varies essentially linearly with engine speed.

2. A device as defined in claim 1 including a milliammeter connected to said field-effect transistor for receiving said resulting signal.

3. A device as defined in claim 2 wherein said circuit means includes a memory capacitor adapted to be charged by said signal voltage to a level representative of the maximum engine speed achieved in an interval of engine operation and switch means for selectively connecting said capacitor to the input of said field-effect transistor.

4. A device as defined in claim 1 including means for adjusting the nonlinearity of said voltage signal level as a function of engine speed.

5. A device as defined in claim 1 including means for expanding said voltage signal within a defined range while simultaneously suppressing said voltage signal level in other ranges above or below said defined range.

6. A device as defined in claim 5 including a milliammeter means for displaying said voltage expansion and suppression.

7. A device as defined in claim 1 wherein said circuit means includes an output suitable for operating voltage actuated control devices.

8. A device as defined in claim 7 wherein said circuit means includes an output suitable for operating voltage actuated control devices, wherein said voltage actuated control devices would include means for regulating engine speed.

9. A tachometer for converting an electrical pulse train signal representative of an engine speed into a voltage level that varies linearly with the engine speed rate, comprising:

a milliammeter,
a direct current voltage source,
a circuit connected to said voltage source responsive to said electrical pulse train for producing uniform operating pulses at the frequency of said electrical pulse train,
circuit means connected to said circuit for converting said operating pulses to a voltage signal with a level that varies non-linearly with engine speed,
a field-effect transistor receiving its input from said circuit means and delivering its output to said meter, and
means for biasing said field-effect transistor into having a response characteristic that varies non-linearly with voltage level in a manner such that the input supplied to said milliammeter varies linearly with engine speed.

10. A tachometer as defined in claim 9 in combination with an internal combustion engine electrical ignition system.

11. In an electronic tachometer for an internal combustion engine having an electrical ignition system and a direct current voltage source, the tachometer having a milliammeter, a circuit connected to said voltage source and responsive to electrical pulses from the ignition system at a frequency representative of the speed rate to be measured for producing uniform operating pulses at the frequency of said electrical pulses, and circuit means connected between said circuit and said milliammeter for converting said operating pulses to a voltage signal representative of engine speed, to be applied to said milliammeter, the improvement which comprises:

a memory capacitor in said circuit means, adapted to be charged by said signal voltage to a level representative of the maximum engine speed achieved in an interval of engine operation,
switch means for measuring the charge on said capacitor using said milliammeter,
a diode in said circuit means through which said memory capacitor is charged, said diode being adapted to assure that the charge developed on said memory capacitor is at the same level as said engine speed voltage signal, and means for cancelling out the forward voltage drop across said diode when the voltage stored across said memory capacitor is measured by said meter in response to actuation of said switch means.

12. A tachometer as defined in claim 11 including means for cancelling out errors caused by radio frequency interference.

* * * * *